July 24, 1962 J. PERLMUTTER 3,045,737
SNOW CLEATS FOR AUTOMOBILE TIRES
Filed April 10, 1961

United States Patent Office 3,045,737
Patented July 24, 1962

3,045,737
SNOW CLEATS FOR AUTOMOBILE TIRES
Jerome Perlmutter, 4 Whaleneck Drive, Merrick, N.Y.
Filed Apr. 10, 1961, Ser. No. 101,697
4 Claims. (Cl. 152—221)

This invention relates generally to the field of anti-skid devices which may be temporarily mounted on the wheels of an automobile delivering traction, for intermittent or emergency use. Devices of this type are generally known in the art, and the invention lies in specific constructional details permitting increased useful life and relatively low manufacturing cost.

The most common type of device employed for the above purpose consists of a pair of linked chains connected at each end to metal frames, the metal frames having strap means adapted to be inserted through slots in the felloe of a wheel. The strap is provided with a buckle which secures the same in position. Devices of this type, while useful, have shown many serious disadvantages. Firstly, it is usually necessary to insert the strap means from the concealed side of the tire, as the buckle will not pass through the slot in the felloe, and it is therefore impossible to install such chains without dirtying the hands of the user. Further, the location of the slot in the felloe from the inside of the wheel is difficult, owing to the fact that the same is usually not exposed to view. Another disadvantage of conventional constructions lies in the fact that they must be removed immediately before proceeding to drive on dry paved highways or concrete roads, which wear the links of chain to a degree wherein the same is no longer serviceable within a relatively few miles. During such operation, the ride experienced by occupants of an automobile is extremely rough owing to the thickness of the chains and the concentration of the same over a relatively small amount of the total area of the tire. A further difficulty has been experienced in that the strap means are usually formed of canvas webbing which, when wet, becomes almost impossible to engage or disengage with respect to the clamping or buckling device with which it connects.

It is therefore among the principal objects of the present invention to provide an improved anti-skid device of the class described in which the above-mentioned disadvantages have been substantially eliminated.

Another object of the invention lies in the provision of an improved anti-skid device which will offer superior traction on icy and snow-covered roads as contrasted with prior art devices.

A feature of the invention lies in the fact that no adjustment is necessary once installed, owing to provisions for constant tension upon the strap element, even if the tire loses some air.

Another object of the invention lies in the provision of an anti-skid device which will offer substantially less vibration while driving at moderate speeds as contrasted with prior art devices. This is possible not only because of the elimination of metallic link chains, but because of the reduction in centrifugal force generated by the devices during driving, due to the lighter rotating mass, whereby the imbalance of the wheels with which the devices are associated is materially reduced.

A further object of the invention lies in the provision of an anti-skid device of the class described which may be left on the tires while driving on dry, paved highways or concrete roads.

Still another object of the invention lies in the provision of an improved anti-skid device in which the useful life of the same as compared with conventional chains is materially greater.

Another feature of the invention lies in the elimination of securing means such as a buckle. Such securing means allows the strap element to loosen during use, causing rough riding and frequent breaking of the strap element.

Another feature of the invention lies in the ease with which the device may be installed, as the strap element thereof is inserted from the outside of the wheel through the slot in the felloe.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
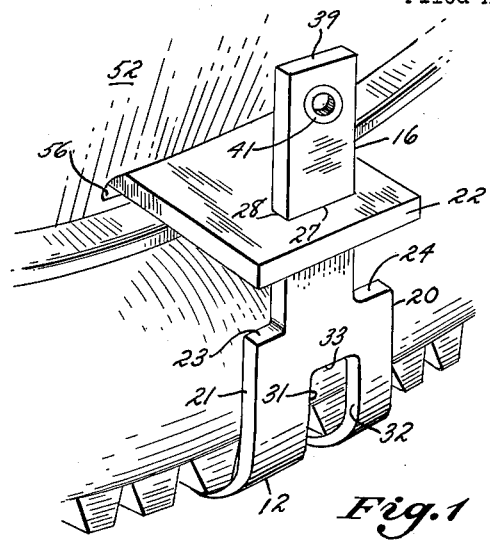
FIGURE 1 is a fragmentary view in perspective of an embodiment of the invention, showing the device in installed condition upon a conventional tire and wheel.

In accordance with the invention, the device, generally indicated by reference character 10, comprises broadly: first and second cleat elements 11 and 12, respectively, and a tensioning element 13 interconnecting said first and second cleat elements.

The first and second cleat elements 11 and 12 are substantially similar, and accordingly a detailed description of one of said cleat elements will serve to describe the other. Each element includes an elongated strip of rubber or other flexible non-metallic material, preferably reinforced by the presence of cord plies (not shown) as is well-known in the tire-making art. The strip includes a main body element 15 and a strap element 16 integrally formed therewith.

The main body element 15 is bounded by an inner surface 18, an outer surface 19, side edges 20 and 21, and end edges 22, 23 and 24. Disposed adjacent a first end of said generally rectangular main body element is a transversely disposed slit 25 of rectangular configuration, the same being bounded by side edges 26 and 27, as well as end edges 28 and 29. The distance between the side edges 26 and 27 substantially corresponds to the thickness of the strip from which the cleat elements 11 and 12 are made, while, as will more fully appear, the length of the slit 25 as measured between the end edges 28 and 29 is substantially equivalent to the width of the strap element 16. If desired, there may be provided a longitudinally disposed opening 30 bounded by side edges 31 and 32, as well as end edges 33 and 34 to provide additional surfaces for traction.

The strap element 16, as has been mentioned, is formed integrally with the main body element 15, and is bounded by an inner surface 36, and an outer surface 37. A free end 38 is bounded by a free end edge 39, the inner end 40 forming an attachment with the main body element 15. The opening 41 which provides for the engagement of the tensioning element 13 is preferably spaced a distance sufficient from the free end edge 39 to give sufficient mechanical strength.

Figure 3:
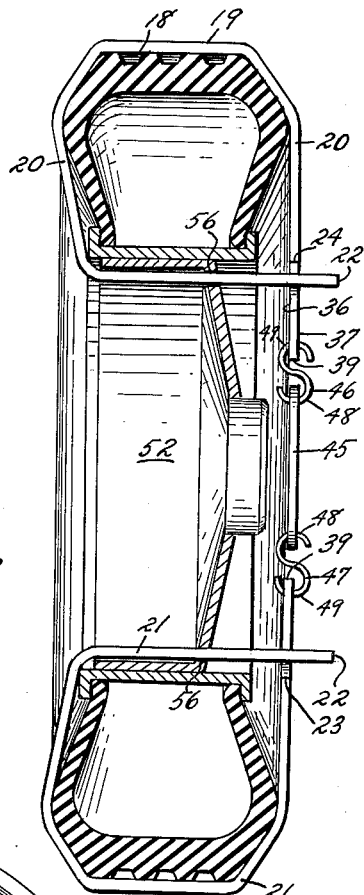
FIGURE 3 is a sectional view of a complete embodiment showing the same in installed condition upon a wheel and tire, as seen from the plane 3—3 in FIGURE 4.
Figure 2:
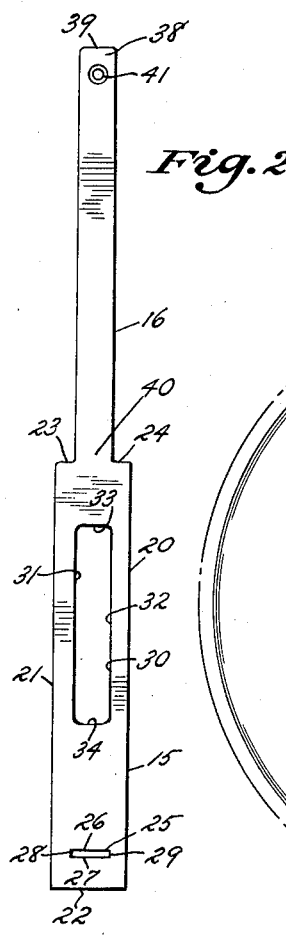
FIGURE 2 is a view in elevation of one of the cleat elements comprising a part of the embodiment.
Figure 4:
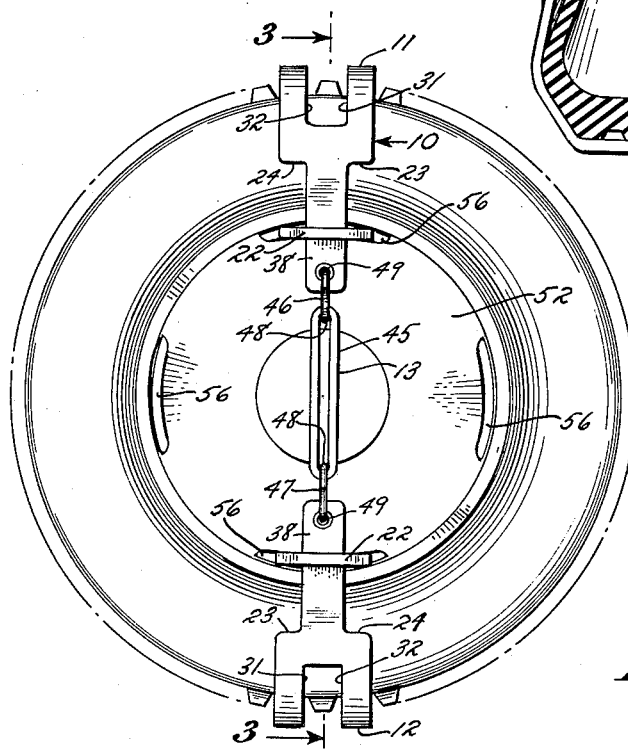
FIGURE 4 is a side elevational view of an embodiment in installed condition.

The tensioning element 13 includes a rubber loop member 45 as well as first and second S-hooks 46 and 47, respectively. As best seen in FIGURES 3 and 4, first ends 48 of the S-hooks 46 and 47 are engaged with the loop member 45, while second ends 49 thereof engage the openings 41 of each of the first and second cleat elements 11 and 12.

During installation, the free ends 38 of each of the first and second cleat elements are threaded through the outside of the wheel, generally indicated by reference character 52, by inserting them into the conventional slots 56, in the felloe. After looping the same around the exposed outer tread of the tire, the strap elements 16 are inserted into the transverse slits 25 and pulled firmly to assume the condition shown in FIGURES 3 and 4. Owing to the relatively close tolerances between the strap element 16 and the transverse slit 25, the devices have a self-locking action which increases as the strap element is distorted upon installation. Thus, the tensioning element 13, when engaged, need provide only a minimum degree of tension to prevent accidental disconnection of the engagement of the cleat element. Whatever effort is necessary to complete the threading operation is performed on the outside of the wheel where the engagement and threading operation is fully visible to the user. The advantage of such frictional engagement of the strap element 16 in the transverse slit 25, lies in the fact that there is less likelihood of the tensioning element 13 breaking, and less likelihood of there being sufficient pressure on the S-hook 47 to pull the same through the openings 41 in the strap element 16, or to break the opening. Yet such frictional engagement and the use of the rubber loop 45, provides for constant tension and a tight fit of the cleat on the wheel even if the tire should lose some air.

It is to be understood that more than one device 10, comprising broadly first and second cleat elements 11 and 12 respectively, and the tensioning element 13, may be installed on a single wheel.

It may thus be seen that I have invented novel and highly useful improvements in snow cleats for automobile tires, in which case of installation and removal are but a few of the many salient features. As the cleat elements may be made from single stampings of planar non-metallic material, the cost of the same may be maintained at a very low order, and by the complete elimination of metallic components in the cleat elements the durability and useful life of the same is materially increased. The devices may be installed and removed by those having only ordinary skill, and without resort to any tools, thus simplifying installation in difficult situations.

I wish it to be understood that I do not consider the invention limited to the precise details of structure shown and set forth in this specification, for obvious modifications will occur to those skilled in the art to which the invention pertains.

I claim:

1. A snow cleat for use in conjunction with an automobile tire of the class described, comprising: a unitary elongated strip of flexible non-metallic planar material of predetermined thickness, and having a degree of resilience, including a main body member having first and second ends, there being a transverse slot in said first end of predetermined length and having a principal slot axis perpendicular to the plane of said strip, and of width substantially conforming to said predetermined thickness; and an integrally formed strap member on said second end having a width substantially conforming to that of said predetermined length of said slot, whereby upon the coaxial insertion of said strap member into said slot, and the distorting of said strap member under tension to other than coaxial relation with respect to said principal axis of said slot, said strap member is frictionally maintained in engaged condition therewith.

2. A snow cleat for use in conjunction with an automobile tire of the class described, comprising: a unitary elongated strip of reinforced flexible non-metallic planar material of predetermined thickness, and having a degree of resilience, including a main body member having first and second ends, there being a transverse slot in said first end of predetermined length and having a principal slot axis perpendicular to the plane of said strip, and of width substantially conforming to said predetermined thickness; and an integrally formed strap member on said second end having a width substantially conforming to that of said predetermined length of said slot, whereby upon the coaxial insertion of said strap member into said slot, and the distorting of said strap member under tension to angular relation with respect to said principal axis of said slot, said strap member is frictionally maintained in engaged condition therewith.

3. A snow cleat for use in conjunction with an automobile tire of the class described, comprising: a unitary elongated strip of flexible non-metallic planar material of predetermined thickness, and having a degree of resilience, including a main body member having first and second ends, there being a transverse slot in said first end of predetermined length and having a principal slot axis perpendicular to the plane of said strip, and of width substantially conforming to said predetermined thickness; and an integrally formed strap member on said second end having a width substantially conforming to that of said predetermined length of said slot, said strap member having a free end, there being an opening adjacent said free end; whereby upon the coaxial insertion of said strap member into said slot, and the distorting of said strap member under tension to other than coaxial relation with respect to said principal axis of said slot, said strap member is frictionally maintained in engaged condition therewith.

4. In a snow cleat construction for automobile tires of the class described, first and second substantially similar cleat elements, and a tensioning element interconnecting said cleat elements, each of said cleat elements comprising a unitary elongated strip of flexible non-metallic planar material of predetermined thickness, and having a degree of resilience, said strip including a main body member having first and second ends, there being a transverse slot in said first end of predetermined length, and of a width substantially conforming to said predetermined thickness, and an integrally formed strap member on said end having a width substantially conforming to that of said predetermined length of said slot; said slot having a principal slot axis perpendicular to the plane of said strip, said strap member having a free end, there being an opening adjacent said free end; said tensioning element including a resilient element, and first and second means engageable within said openings in said strap members of each of said first and second cleat elements, wherein upon the coaxial insertion of said strap members into said slots in each of said cleat elements, and the interconnection of said tensioning element at the ends thereof with each of said strap members, and the distortion of said strap members under tension to other than coaxial relation with respect to the principal axes of respective slots, said strap members are frictionally maintained in engaged condition within said slots, said tensioning element maintaining said strap members in stiffened condition to increase the frictional effect of said distorted condition.

References Cited in the file of this patent

UNITED STATES PATENTS

| | | |
|---|---|---|
| 1,794,676 | Douglass | Mar. 3, 1931 |
| 2,361,506 | Smith | Oct. 31, 1944 |
| 2,638,953 | Mulholland | May 19, 1953 |
| 2,936,980 | Rapata | May 17, 1960 |

FOREIGN PATENTS

| | | |
|---|---|---|
| 796,222 | France | Jan. 17, 1936 |
| 1,115,201 | France | Dec. 26, 1955 |